(12) United States Patent
Schmidt et al.

(10) Patent No.: US 6,685,349 B2
(45) Date of Patent: Feb. 3, 2004

(54) MARKER LIGHT MODULE

(75) Inventors: Grischa Schmidt, Basel (CH); Floris P. Spoel, Issaquah, WA (US); Ben Speirs, Kirkland, WA (US); Ian D. O'Connor, Mill Creek, WA (US)

(73) Assignee: Paccar Inc, Bellevue, WA (US)

( * ) Notice: Subject to any disclaimer, the term of this patent is extended or adjusted under 35 U.S.C. 154(b) by 0 days.

(21) Appl. No.: 09/898,535

(22) Filed: Jul. 2, 2001

(65) Prior Publication Data
US 2003/0002292 A1 Jan. 2, 2003

(51) Int. Cl.[7] .............................................. F21V 33/00
(52) U.S. Cl. ....................... 362/506; 362/540; 362/240; 340/472; 340/475
(58) Field of Search .................................... 362/506, 540, 362/545, 240; 340/475, 472

(56) References Cited

U.S. PATENT DOCUMENTS

| | | | | |
|---|---|---|---|---|
| 1,435,080 A | | 11/1922 | Potter | |
| 1,443,290 A | * | 1/1923 | Strong | |
| 1,691,502 A | | 11/1928 | Snyder | |
| 3,017,500 A | * | 1/1962 | Pezzopane | |
| 3,633,161 A | | 1/1972 | Price | |
| 3,947,677 A | * | 3/1976 | Steinle | 340/8.1 R |
| 4,297,675 A | | 10/1981 | Rubottom et al. | |
| 4,430,133 A | * | 2/1984 | Griffith | 156/94 |
| 4,797,792 A | * | 1/1989 | Oen | 362/83 |
| 4,802,069 A | * | 1/1989 | Chandler | 362/83 |
| 4,825,191 A | | 4/1989 | Ching-Hwei | |
| 4,839,776 A | * | 6/1989 | Grossnickle | 362/31 |
| 4,894,755 A | * | 1/1990 | Chandler | 362/83 |
| 4,953,065 A | | 8/1990 | Kao | |
| 4,954,808 A | | 9/1990 | Duerkob | |
| 4,968,124 A | * | 11/1990 | Decker et al. | 350/574 |
| 5,040,100 A | * | 8/1991 | Di Gaetano | 362/80 |
| 5,072,340 A | * | 12/1991 | Jones | 362/80 |
| 5,073,768 A | | 12/1991 | Willaredt | |
| 5,255,164 A | | 10/1993 | Eidelman | |
| 5,406,465 A | * | 4/1995 | Farchione | 362/72 |
| 5,430,625 A | * | 7/1995 | Abarr et al. | 362/80 |
| 5,495,400 A | | 2/1996 | Currie | |
| 5,548,274 A | * | 8/1996 | Anderson et al. | 340/468 |
| 5,558,426 A | * | 9/1996 | Cabanatan et al. | 362/78 |
| 5,573,686 A | * | 11/1996 | Lavicska | 219/202 |
| 5,682,138 A | | 10/1997 | Powell et al. | |
| 5,688,036 A | | 11/1997 | Marshall et al. | |
| 5,893,638 A | * | 4/1999 | Hufner et al. | 362/506 |
| 6,152,590 A | * | 11/2000 | Furst et al. | 362/545 |
| 6,422,725 B1 | * | 7/2002 | Fong | 362/500 |

* cited by examiner

*Primary Examiner*—Alan Cariaso
*Assistant Examiner*—Jacob Y. Choi
(74) *Attorney, Agent, or Firm*—Christensen O'Connor Johnson Kindness PLLC

(57) ABSTRACT

A truck fender marker light system has one or more illuminated modules set into the corner formed by the top face and the outermost face of the fender.

20 Claims, 1 Drawing Sheet

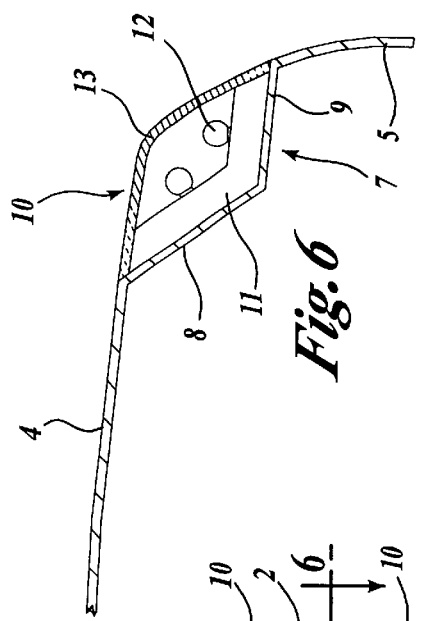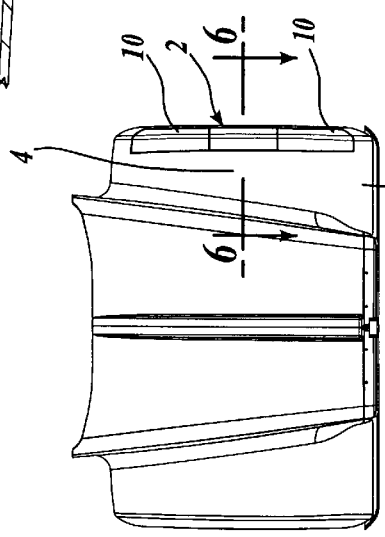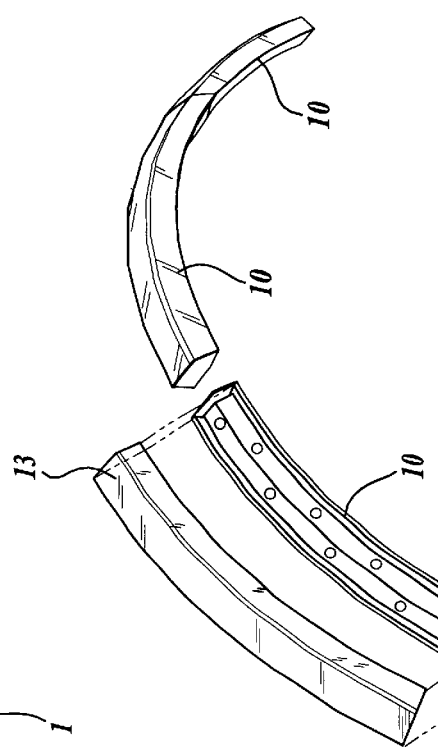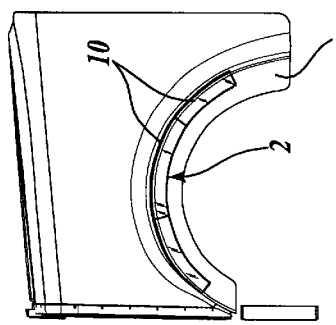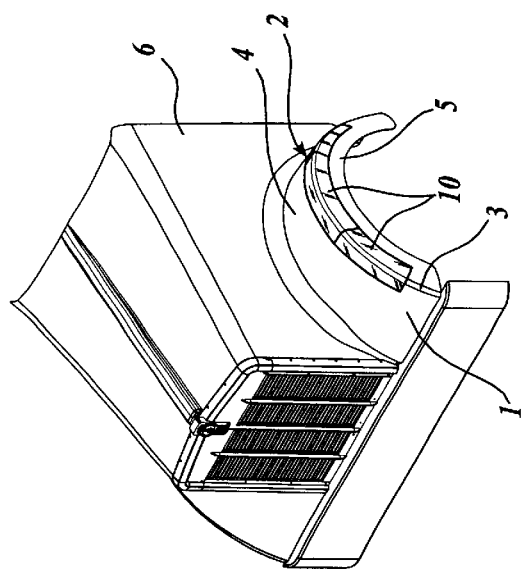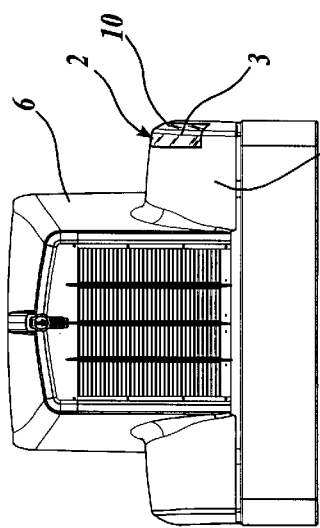

MARKER LIGHT MODULE

FIELD OF THE INVENTION

The invention relates to marker lights and turn signals for conventional trucks, truck tractors and other motor vehicles.

BACKGROUND OF THE INVENTION

At present marker lights and turn signals are mounted at the rear, front and sides of motor vehicles. In the case of large motor vehicles such as conventional trucks and truck tractors, the vehicle may have front fenders that project from the body. Such fenders typically include upper surfaces closely overlying the wheels but below the upper surface of the hood. Such a front fender may have a marker light and/or turn signal protruding from the top of the fender, it may have marker lights and/or turn signals integrated into the front and/or rear surface of the fender, and/or it may have reflex reflectors, or it may not have any lights or reflex reflectors. Turn signals and/or marker lights can also be positioned in other places on the front of the vehicle.

Fenders that do not have any marker lights can be difficult to identify and locate at night, and those fenders with existing lights are not clearly marked.

SUMMARY OF THE INVENTION

The present invention provides a fender-mounted turn signal and/or marker light module disposed on the outermost upper corner of a motor vehicle fender and positioned so that it is clearly visible from the front, side, and behind the fender. The module may include multiple light sources. The improved module marks the outermost extremity of a fender and is readily visible from the side. In the preferred embodiment, the module in accordance with the present invention is incorporated in the upper corner portion of the fender, i.e., in the junction of the upright outer surface of the fender and the curved top above the wheel.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 1 is a top front isometric, projection of a conventional truck hood and fender assembly, with a marker light module in accordance with the present invention shown on the left fender.

FIG. 2 is a top plan of the truck hood and fender assembly shown in FIG. 1.

FIG. 3 is a front elevation of the truck hood and fender assembly shown in FIG. 1.

FIG. 4 is a side elevation of the truck hood and fender assembly shown in FIG. 1.

FIG. 5 is an enlarged fragmentary, top front perspective of the marker light module with parts shown in exploded relationship.

FIG. 6 is an enlarged section along line 6—6 of FIG. 2.

DETAILED DESCRIPTION OF THE PREFERRED EMBODIMENT

FIGS. 1 through 4 show the position of the marker light module or modules 10 of the present invention as mounted on the front fender 1 of a conventional motor vehicle hood and fender assembly. The composite light assembly 2 is incorporated in a substantial length of the corner 3 formed by the top 4 of the fender 1 and the outermost upright face or skirt 5 of the fender 1. Fender 1 projects outward from the raised hood structure 6 and overlies a wheel.

In the embodiment shown, the top 4 of the fender 1 consists of a one-third section of a cylinder, approximately 120° in extent, attached at its inner edge to the longitudinal upright surface of the hood 6 by any conventional means. It will be readily apparent to anyone skilled in the art that the top 4 of the fender 1 can be formed of a wide variety of surfaces, including greater or lesser sections of cylinders and compound curved surfaces. An outermost upright face or skirt 5 that includes an opening for the wheel of the vehicle is attached or formed at the outermost edge of the top 4 of the fender 1. Together, the skirt 5 and the top 4 of the fender 1 form a corner 3, which may be rounded but typically is abrupt.

As shown in FIG. 4, the light assembly 2 is positioned along a substantial length of the corner 3. In the embodiment shown, the light assembly 2 completes approximately a quarter circle arc, i.e., at least about 90°, with the mid-point of the light assembly 2 near the highest point of the corner 3. In alternate embodiments the light assembly 2 may be positioned at any point along the corner 3 of the fender 1, although it is preferred that the light assembly 2 be positioned so that at least some portion of it extends both forward and rearward from the highest point of the corner 3.

As shown in FIG. 6, in the illustrated embodiment, the corner 3 has an elongated recess 7 where the light assembly 2 is located. The recess 7 has a generally horizontal extending shoulder 9 and a generally upright surface 8. The recess 7 can be formed into the corner 3 during manufacture of the fender 1, such as by molding as in the case of fiberglass fenders or stamping in the case of sheet metal fenders. The light assembly 2 is fixed into the recess 7 by any conventional means, such as bolts, rivets, snap fittings, or adhesive.

In the embodiment shown the light assembly 2 consists of three modules 10, each of which may be separately attached to and removed from the fender 1. Each module 10 includes a base 11, shaped complementary to the corner recess 7. A plurality of light sources 12, conventionally wired, are carried by the base, and the assembly is closed by a translucent cover or lens 13. It will be apparent to those skilled in the art that the light assembly 2 can also consist of a single module, or two modules, or that base 11 of each module 10 can be omitted and the light sources 12 and covers 13 mounted directly to the fender 1 without departing from the spirit and scope of the invention. Nevertheless, an integrated base, light and lens structure is preferred. In the illustrated embodiment, the light sources 12 are electric light bulbs. The light sources 12 are wired to the vehicle's electrical system and controlled and used in the same manner as any conventional side marker light or turn signal.

In the embodiment shown each cover 13 is shaped to form a smooth continuation of the top 4 and skirt 5. The covers 13 are translucent and preferably incorporate reflect reflectors for increased visibility. The light sources 12 may provide white or colored light. The covers 13 and light sources 12 may be colored in any combination such that they produce a red or amber light when the light sources 12 are illuminated, as appropriate to their function and any relevant government regulations.

The length of the light assembly 2 also permits different sections of the light assembly 2 to be controlled in different manners. In the embodiment shown, the front module is connected to the vehicle's electrical system in the same manner as a front turn signal, the middle module is connected to the electrical system solely as a side marker light, and the rear module is connected to the electrical system as a front turn signal repeater. All three modules incorporate reflect reflectors. Additional turn signals and side marker lights may be provided in conventional locations.

In use, the modules are clearly visible from the front, rear and adjacent side of the vehicle. The modules provide a clear indication to other drivers of the outermost location of the front of the vehicle, which might otherwise be hard to see at night or in bad weather. As compared to lights which project from a fender or other part of the truck body, the module in accordance with the present invention also is less likely to be damaged by snagging, by flying debris, or by contact with other objects, in addition to presenting an aesthetically pleasing appearance.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A lighting system for a vehicle having a body, such lighting system comprising a fender projecting from the vehicle body, such fender having a substantially horizontally extending upper portion overlying a wheel of the vehicle, an outermost upright skirt portion forming an opening for the wheel of the vehicle and a corner portion joining the substantially horizontally extending upper portion and the outermost upright skirt portion, such lighting system including an illuminated portion having an elongated light assembly extending a substantial distance along the corner portion, and a light source mounted in the assembly.

2. The lighting system of claim 1 wherein the corner portion and the assembly are arcuate.

3. The lighting system of claim 2 wherein the corner portion has a highest point and the illuminated portion of the arcuate assembly extends a substantial distance in opposite directions forward and rearward from said highest point.

4. The lighting system of claim 2 wherein the arcuate assembly describes at least about a 90 degree arc along the corner portion of the fender.

5. The lighting system of claim 2 wherein the corner portion includes an elongated recess between the substantially horizontally extending upper portion of the fender and the outermost upright skirt portion of the fender, the arcuate assembly further comprising a base fitted in the recess, light sources carried on the base, and a cover secured to the base and enclosing the light sources.

6. The lighting system of claim 5 wherein the arcuate assembly forms a smooth extension of at least one of the upper portion and the skirt portion of the fender.

7. The lighting system of claim 5 wherein the arcuate assembly forms a smooth extension of both of the upper portion and the skirt portion of the fender.

8. The lighting system of claim 5 wherein the front and rear portions of the arcuate assembly act as turn signals.

9. The lighting system of claim 2 wherein the arcuate assembly is further comprised of two or more separate modules placed end to end.

10. The lighting system of claim 1 wherein the corner portion has a highest point and the assembly is comprised of two separate modules spaced apart from each other, one of said modules being mounted forward of said highest point and the other of said modules being mounted rearward of said highest point.

11. A lighting system for a fender projecting from a vehicle body, such fender having a generally horizontally extending upper portion overlying a wheel, a generally upright skirt portion and a corner portion joining the upper portion and the skirt portion, said system comprising an elongated light assembly extending a substantial distance along the corner portion, and a light source mounted in the assembly, the corner portion having a highest point and the assembly being comprised of two separate modules spaced apart from each other, one of said modules being mounted forward of said highest point and the other of said modules being mourned rearward of said highest point, the forward module being powered as a turn signal and the rearward module being powered as a turn signal, said forward and rearward modules having separate turn signal light sources.

12. A lighting system for a vehicle having a body, such lighting system comprising a fender projecting from the vehicle body, such fender having a substantially horizontally extending upper portion overlying the wheel of the vehicle, an outermost upright skirt portion forming an opening for the wheel of the vehicle and a corner portion joining the upper portion and the skirt portion, the corner portion having a highest point and an elongated recess, said system including an illuminated portion having an arcuate assembly describing at least about a 90 degree arc along the corner portion, said arcuate assembly extending forward and rearward of said highest point, said arcuate assembly further comprising a base mounted in the recess, light sources carried on the base, and a cover connected to the base and enclosing the light sources, said cover forming a smooth extension of both said upper portion and said skirt portion of said fender.

13. An illumination system for a vehicle body, comprising a fender having a substantially horizontally extending upper portion overlying a wheel, an outermost upright skirt portion forming an opening for the wheel, a corner portion joining the upper portion and the skirt portion, and an elongated recess extending a substantial distance along said corner portion, and an assembly complementary to said elongated recess, said assembly having a light source mounted therein.

14. The lighting system of claim 13 wherein the assembly is arcuate.

15. The lighting system of claim 14 wherein the corner portion has a highest point and the assembly includes an illuminated portion that extends substantial distances in opposite directions forward and rearward from said highest point.

16. The lighting system of claim 14 wherein the assembly further comprises a base mounted in the recess, light sources carried in the base, and a cover connected to the base and enclosing the light sources.

17. The lighting system of claim 14 wherein the assembly forms a smooth extension of at least one of the upper portion and the skirt portion of the fender.

18. The lighting system of claim 14 wherein the assembly forms a smooth extension of both of the upper portion and the skirt portion of the fender.

19. The lighting system of claim 14 wherein the front and rear portions of the assembly act as turn signals.

20. The lighting system of claim 14 wherein the assembly is further comprised of two or more separate modules placed end to end.

* * * * *

UNITED STATES PATENT AND TRADEMARK OFFICE
CERTIFICATE OF CORRECTION

PATENT NO. : 6,685,349 B2
DATED : February 3, 2004
INVENTOR(S) : G. Schmidt et al.

It is certified that error appears in the above-identified patent and that said Letters Patent is hereby corrected as shown below:

<u>Title page,</u>
Item [73], Assignee, "Paccar Inc," should read -- PACCAR Inc, --

<u>Column 4,</u>
Lines 1-15, delete claim 11 in its entirety and substitute therefor:

> --11. A lighting system for a vehicle having a body, such lighting system comprising a fender projecting from the vehicle body, such fender having a substantially horizontally extending upper portion overlying a wheel of the vehicle, an outermost upright skirt portion forming an opening for the wheel of the vehicle and a corner portion joining the upper portion and the skirt portion, such lighting system including an illuminated portion having an elongated light assembly extending a substantial distance along the corner portion, and a light source mounted in the assembly, the corner portion having a highest point and the assembly being comprised of two separate modules spaced apart from each other, one of said modules being mounted forward of said highest point and the other of said modules being mounted rearward of said highest point, the forward module being powered as a turn signal and the rearward module being powered as a turn signal, said forward and rearward modules having separate turn signal light sources.--

Signed and Sealed this

First Day of June, 2004

JON W. DUDAS
*Acting Director of the United States Patent and Trademark Office*